(12) United States Patent
Huang et al.

(10) Patent No.: US 7,744,293 B2
(45) Date of Patent: Jun. 29, 2010

(54) COAXIAL OPTO-ELECTRONIC DEVICE HAVING SMALL FORM FACTOR INSULATING STRUCTURE

(75) Inventors: Danhua Huang, Hubei (CN); Haiming Hu, Hubei (CN); Shiyu Li, Hubei (CN)

(73) Assignee: Wuhan Telecommunications Devices Co., Ltd., Hubei (CH)

( * ) Notice: Subject to any disclaimer, the term of this patent is extended or adjusted under 35 U.S.C. 154(b) by 196 days.

(21) Appl. No.: 11/988,329

(22) PCT Filed: Jul. 5, 2006

(86) PCT No.: PCT/CN2006/001570

§ 371 (c)(1),
(2), (4) Date: Jan. 4, 2008

(87) PCT Pub. No.: WO2007/003141

PCT Pub. Date: Jan. 11, 2007

(65) Prior Publication Data

US 2009/0034914 A1     Feb. 5, 2009

(30) Foreign Application Priority Data

Jul. 5, 2005    (CN) ............... 2005 2 0097068 U

(51) Int. Cl.
*G02B 6/36* (2006.01)
*H01L 21/00* (2006.01)

(52) U.S. Cl. ............... 385/92; 385/88; 385/93; 438/25

(58) Field of Classification Search ............ 385/33, 385/39, 49, 88, 92–93; 438/25; 257/E33.077
See application file for complete search history.

(56) References Cited

FOREIGN PATENT DOCUMENTS

CN          2770274    *   4/2006

* cited by examiner

*Primary Examiner*—Charlie Peng
*Assistant Examiner*—Michael P Mooney
(74) *Attorney, Agent, or Firm*—Scully, Scott, Murphy & Presser, P.C.

(57) ABSTRACT

A coaxial opto-electronic device used for SFF (Small Form Factor) and SFP (Small Form-Factor pluggable) opto-electronic transceiver module comprises an opto-electronic TO CAN (201) having a cap border (106) at one end, a metal tube (203) disposed around the opto-electronic TO CAN (201), and an isolation ring (202) interposed between the end face of the metal tube (203) and the cap border (106). The coaxial opto-electronic device allows the device's metal case ground to be insulated from the inner data ground, and at the same time, the device outer form is small enough and the size of inner part thereof is enlarged.

8 Claims, 3 Drawing Sheets

COAXIAL OPTO-ELECTRONIC DEVICE HAVING SMALL FORM FACTOR INSULATING STRUCTURE

BACKGROUND OF THE INVENTION

1. Field of the Invention

This invention relates to a coaxial opto-electronic device. In particular, the present invention relates to a package structure. For example, the present invention may find particular use in opto-electronic device used in SFF (Small Form Factor) and SFP (Small Form Factor pluggable) opto-electronic transceiver module which is used to interface a host device with an optical communications network.

2. Description of the Related Art

Fiber optics is increasingly used for transmitting voice and data signals. The use of light as a transmission medium presents a number of implementation challenges. In particular, the data carried by light signal must be converted to an electrical format when received by a device. Conversely, when data is transmitted to optical network, it must be converted from an electronic signal to a light signal. A number of protocols such as ANSI Fiber Channel protocol are typically implemented to define the conversion of electronic signals to optical signals and transmission of those optical.

Typically, a transceiver module is electrically interfaced with a host device, such as a host computer, switching hub, network router, switch box, computer I/O and the like via a compatible connection port. Moreover, in some application it is desirable to miniaturize the physical size of the transceiver module to increase the port density and therefore accommodate a higher number of network connections within a given physical space. In addition, in many applications, it is desirable for the module to be inserted and removed from the host system without removing electrical power. To accomplish many of these objectives, international and industry standards have been adopted to define the physical size and shape of optical transceiver modules to ensure compatibility between the optical transceiver modules from different manufacturers. For example, in 1998, a group of optical manufacturers developed a set of standards for optical transceiver modules called the Small Form-Factor Pluggable ("SFP") Transceiver Multi-Source Agreement ("MSA"). This standard defines the details of the electrical interface, the physical size and shape for the SFP transceiver modules and the corresponding host port, so as to ensure interoperability between different manufacturers' products.

While such standards may recommend a limited physical size, the inner opto-electronic devices also demonstrate a smaller physical size. At the same time, the standards require the chassis grounds and external electromagnetic interference shields should not be attached to circuit ground. With the trend of the metallized SFP case, the demand of the case ground of the device in SFP case insulated from the circuit ground has arisen. If the case of the device is insulated from the signal ground, it doesn't matter whether the SFP case is metal or not.

For coaxial devices applied to SFP, the problem to assure as large as possible inner space with insulating structure package has emerged.

SUMMARY OF THE INVENTION

The ROSA and TOSA has been popularly applied to SFF or SFP modules. The standard requires that the case ground of the device in SFP case insulated from the circuit ground. The structure demonstrated here solves the problem with a good effect of saving space.

In accordance with one aspect of the present invention, a coaxial opto-electronic device, comprising: an opto-electronic TO CAN having a cap border at one end, which is used for accommodating electronic elements, a metal tube disposed around the opto-electronic TO CAN (201), and having an end face, and an isolation ring interposed between the end face of the metal tube and the cap border.

In accordance with another aspect of the present invention, a method for assembling an coaxial opto-electronic device, comprising: fitting an isolation ring over an opto-electronic TO CAN, which has a cap border at one end thereof, from an other end opposite to the one end, fitting a metal tube over the opto-electronic TO CAN from the other end with the isolation ring interposed between an end face of the metal tube and the cap border, and agglutinating the opto-electronic TO CAN, the isolation ring, and the metal tube into an integral body by an insulating adhesive.

In the preferred embodiment, the device includes a TO CAN (Transistor Outline Can, a kind of coaxial package device, which is inner sealed and protected by Nitrogen, normally with glass lens in the structure). In conventional design and processing, the TO CAN is sealing welded with a metal tube, which leads to the device case share a common ground with the TO CAN, and with the signal ground. However, in the present application, the outer case is isolated with the TO CAN. This isolation is achieved in two ways: Firstly, the surrounding conducting metal is isolated by insulating adhesive; secondly, the end face conducting part is isolated by the ceramic material or plastic material or any other appropriate non-conducting material.

In addition to the insulating effect, this structure as configured above also constructs a rigid framework at an axial direction of the device, thereby resulting in a convenient coupling.

Another effect of the preferred embodiment is that the adhesive between the metal tube and the TO CAN has only a thinner film than that in the prior art. This effect leads to the virtue of saving space.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made to the drawings to describe preferred embodiments of the present invention. It is to be understood that the drawings are diagrammatic and schematic representations of the preferred embodiments, and are not limiting of the present invention, nor are they necessarily drawn to scale.

In general, the present invention relates to an opto-electronic device, which utilizes the insulating adhesive and insulating ring to isolate the outer metal case from the inner TO CAN. Moreover, the structure can be implemented with almost the smallest space budget. A typical example is that the device according to the present application is capable of containing the generally used TO CAN having an outer diameter 4.6 mm, and at the same time the outer diameter of the device is only 5.6 mm, just the same size as the commercially used device outline which complies with the related industry standards.

Also, while embodiments of the present invention are described in the context of optical transceiver devices used in the field of optical network, it will be appreciated that the teachings of the present invention are applicable to other applications as well. For example, other types of coaxial devices could utilize embodiments of this kind to facilitate the smallest space design with isolating function.

Figure 1:
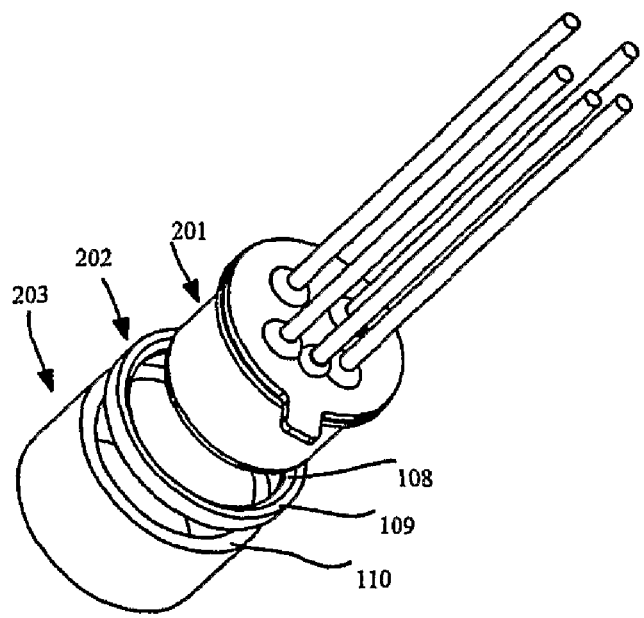
FIGS. 1 and 2 are schematic perspective views of a preferred embodiment of a subassembly structure of a coaxial opto-electronic device according to the present application.
Figure 2:
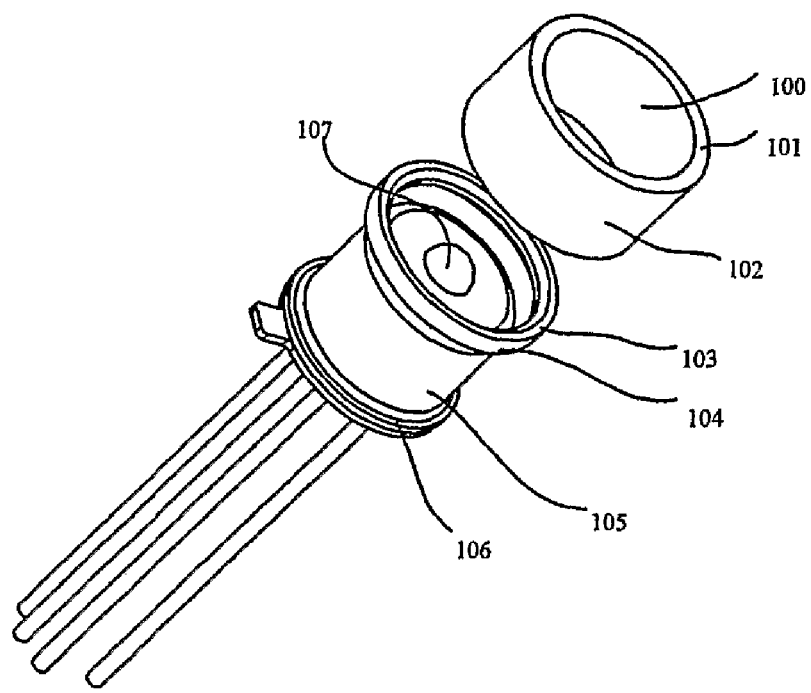
Figure 4:
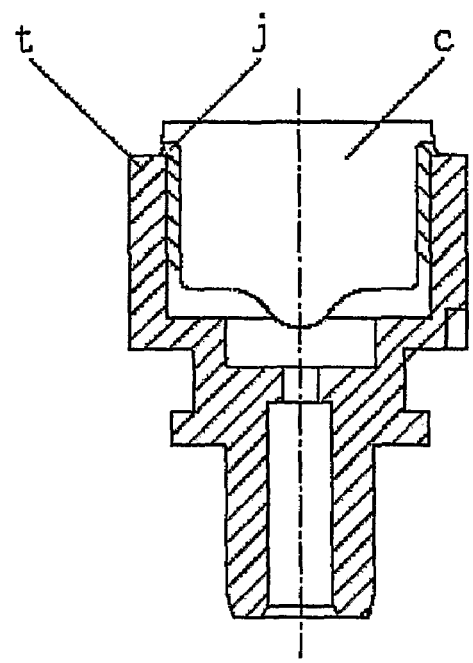
FIG. 4 is a schematic view of an assembled coaxial opto-electronic device according to the present application.
Figure 5:
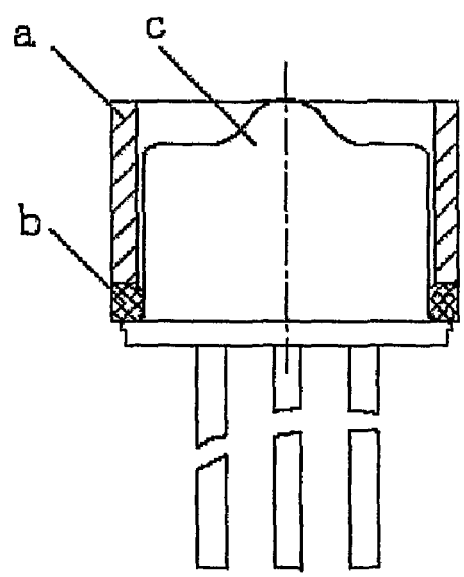
FIG. 5 is a schematic view of an assembled coaxial opto-electronic device according to the present application.

Reference is first made to FIGS. 1 and 2 together, which illustrate perspective views of the presently preferred embodiment of a subassembly structure of a coaxial opto-electronic device. In the illustrated example, the subassembly is comprised of a metal tube 203 (or a in FIG. 5), isolating ring 202 (or b in FIG. 5), opto-electronic TO CAN 201 (or c in FIG. 4).

In this example, the opto-electronic TO CAN 201 accommodates the opto-electronic chip, integrated circuit chip, electronic elements, etc (not shown). The long pins are configured to be electrically connected with the opto-electronic module printed board (not shown). Other pin schemes that are well known could also be used.

Figure 3:
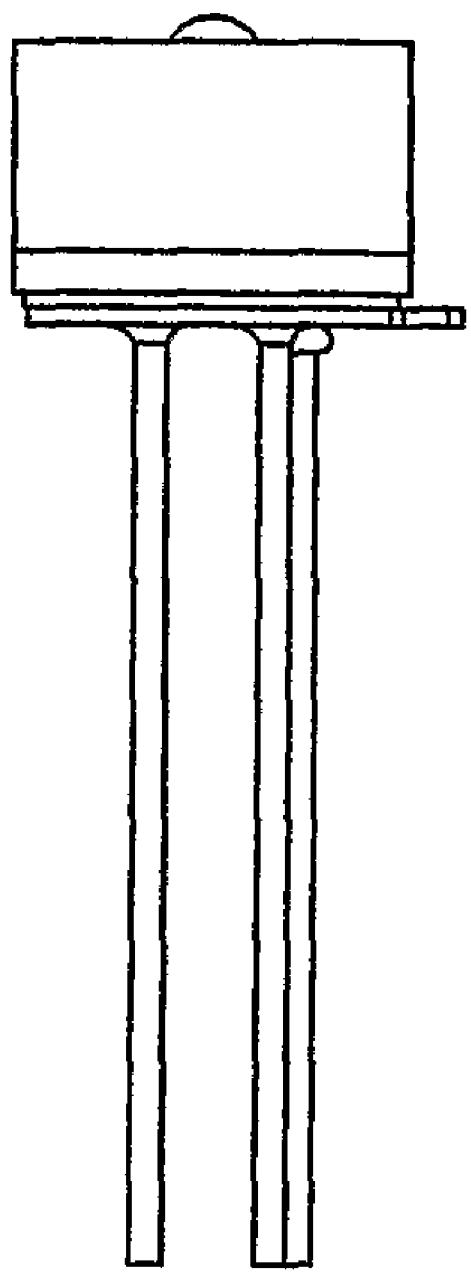
FIG. 3 is a schematic perspective view of an assembled coaxial opto-electronic device according to the present application.

In the illustrated embodiment, an isolating ring, designated at 202, is positioned between the metal tube 203 and opto-electronic TO CAN 201. The isolating ring is made of an isolating material, typically a ceramic material; other appropriate material could also be applied. In the total subassembly, the isolating ring 202 is disposed on a cap border 106 of the opto-electronic TO CAN 201, and the metal tube 203 is disposed upon the isolating ring 202. In an actual subassembly, the isolating ring 202 has an end surface 109 touched with the cap border 106; and an end face 103 touched with an end face 110 of the metal tube 203, as shown in FIGS. 1-3. The metal tube 203 is generally made of a stainless steel, other appropriate material could also be used.

As is further shown in FIGS. 1 and 2, the end face 103 and the opposite end face 109 of the isolating ring 202 are paralleled to each other. The end face 101 and the opposite end face 110 of the metal tube 203 are paralleled to each other. A clearance between an outer cylinder surface 105 of the opto-electronic TO CAN 201 and an inner cylinder surface 100 of the metal tube 203 is filled with a kind of insulating adhesive, which typically is a kind of insulating epoxy, and the other insulating adhesive could also be used. The isolating ring 202 and the opto-electronic TO CAN 201 are agglutinated into an integrated body by the insulating adhesive. The opto-electronic TO CAN 201 and the metal tube 203 are isolated to each other by the isolating ring 202 and the in-between adhesive. In the present invention the integrated body includes two grounds, one is data ground (circuit ground) which is the outer metal surface of the opto-electronic TO CAN 201, and the other is case ground which is a metal surface 102 of the metal tube 203.

A typical process for assembling a coaxial opto-electronic device includes following steps.

An isolating ring 202 is fitted over an opto-electronic TO CAN 201, and then a metal tube 203 is fitted over the opto-electronic TO CAN 201, so that the metal tube 203 and the isolating ring 202 are disposed in an assembling relationship, as well as the metal tube 203 and the opto-electronic TO CAN 201 are disposed in a pre-assembling relationship.

After that, a gap between the metal tube 203 and the TO CAN 201 is evenly and fully filled with adhesive. Then, the integrated components fulfilled above are placed in an oven to be roasted according to the adhesive's temperature and time curve till the adhesive be cured completely. Next or following processes can be easily executed, and typical ones are o-e coupling and laser welding, etc.

A typical application of this invention is to make o-e device using the TO52 cap (which is a metal cap with an optic component and of which an outer diameter is 4.6-4.7 mm) and TO46 header (which is coupled used with TO52 cap in an opto-electronic TO CAN). Therefore, the o-e device meets the related opto-electronic device part requirements described in the SFF and SFP MSA industry standard. As a result, the case ground structured by the metal tube 203 can be connected with the SFP metal case which stand for the case ground. The TO header ground can be connected with the PCB circuit ground which stand for the circuit ground or data ground.

To summarize, the embodiments of the present invention provide a number of advantages over existing coaxial opto-electronic device structure designs. The disclosed device structure utilizes an isolation ring 202 and insulating adhesive (in-between the opto-electronic TO CAN 201 and the metal tube 203), which allow the device's metal case ground to be insulated from the inner data ground and at the same time allow the device outer form and the space of inner part small enough, making the space for the opto-electronic TO CAN 201 enlarged. Because the insulating ring 202, the metal tube 203 and the opto-electronic TO CAN 201 form a rigid skeleton, so that the metal tube end face can bear a reasonable force in an axial direction of the device. In a radial direction of the device, the rigidity is also strong enough for an appropriate designed device structure.

Using this structure, the subsequent coupling process, such as laser welding, can be easily performed. The TO Can which includes TO52 and TO46 can easily be applied in SFF (Small Form Factor) and SFP (Small Form Factor Pluggable) MSA.

It is evident that there are further numerous embodiments of the present invention, which, while not specifically described above, are clearly within the scope and spirit of the present invention. Consequently, the above description is considered to be exemplary only, and the full scope of the present invention is to be determined solely by the appended claims.

What is claimed is:

1. A coaxial opto-electronic device, comprising:
   an opto-electronic TO CAN (201) having a cap border (106) at one end, which is used for accommodating electronic elements,
   a metal tube (201) disposed around the opto-electronic TO CAN (201), and having an end face (110), and
   an isolation ring (202) interposed between the end face (110) of the metal tube (201) and the cap border (106).

2. The coaxial opto-electronic device according to claim 1, wherein the isolating ring (202) comprises an end face (103) and an opposite end face (109) opposite to and in parallel with the end face (103).

3. The coaxial opto-electronic device according to claim 1, wherein the metal tube (203) further comprises an opposite end face (101) opposite to and in parallel with the end face (110).

4. The coaxial opto-electronic device according to claim 1, wherein the isolating ring is made of a ceramic material, or an engineering plastic material which is nonconductive.

5. The coaxial opto-electronic device according to claim 1, wherein a clearance is formed between an outer cylinder surface (105) of the opto-electronic TO CAN (201) and an inner cylinder surface (100) of the metal tube (203).

6. The coaxial opto-electronic device according to claim 1, wherein the metal tube (203), the isolating ring (202) and the opto-electronic TO CAN (201) are agglutinated into an integrated body by an insulating adhesive therebetween.

7. The coaxial opto-electronic device according to claim 1, wherein the isolating ring (202) comprises an end face (103) contacting the cap border (106), and an opposite end face (109) opposite to the end face (103) which contacts the end face (110) of the metal tube 203.

8. A method for assembling an coaxial opto-electronic device, comprising:
    fitting an isolation ring (202) over an opto-electronic TO CAN (201), which has a cap border (106) at one end thereof, from an other end opposite to the one end,
    fitting a metal tube (201) over the opto-electronic TO CAN (201) from the other end with the isolation ring (202) interposed between an end face (110) of the metal tube (201) and the cap border (106), and
    agglutinating the opto-electronic TO CAN (201), the isolation ring (202), and the metal tube (201) into an integral body by an insulating adhesive.

* * * * *